Aug. 8, 1950 — R. N. COLEMAN — 2,518,285
FILTER ELEMENT
Filed Oct. 8, 1945 — 2 Sheets-Sheet 2
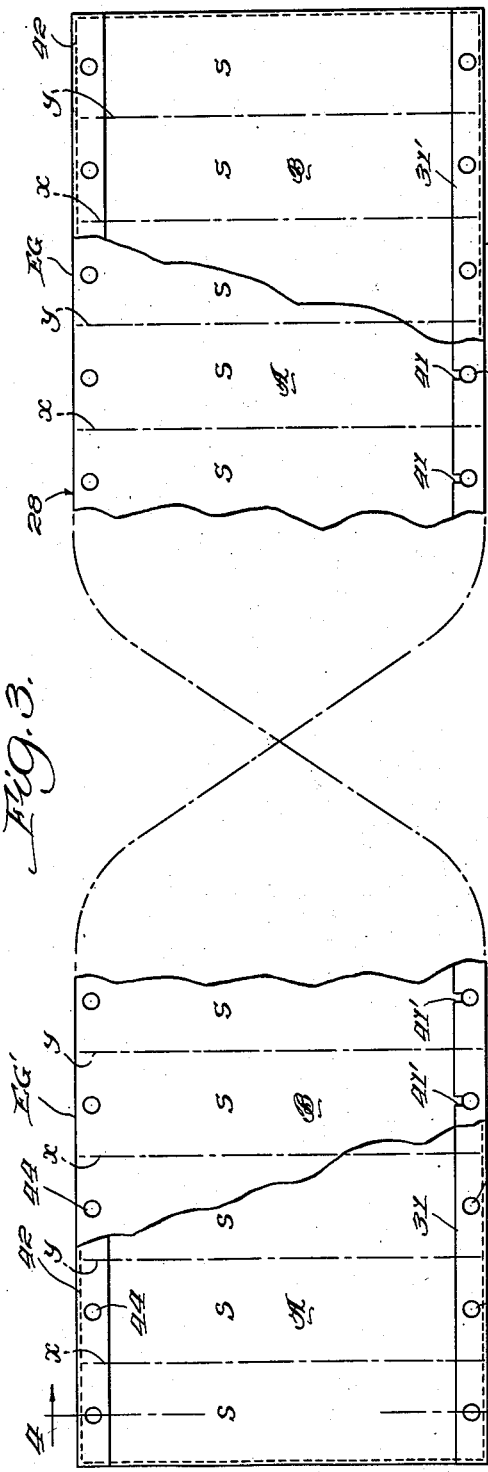
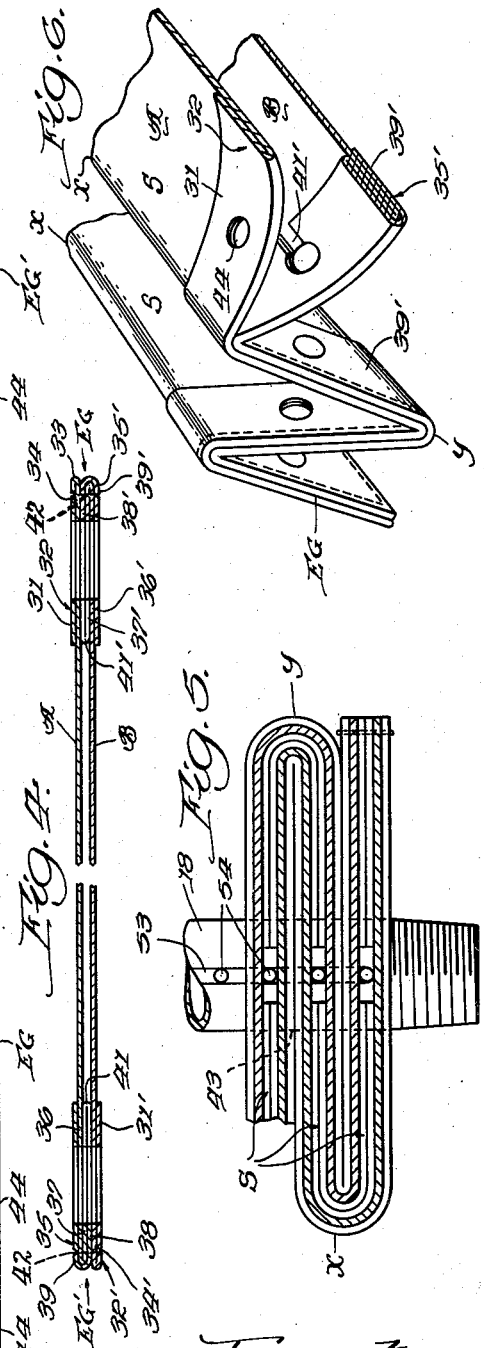
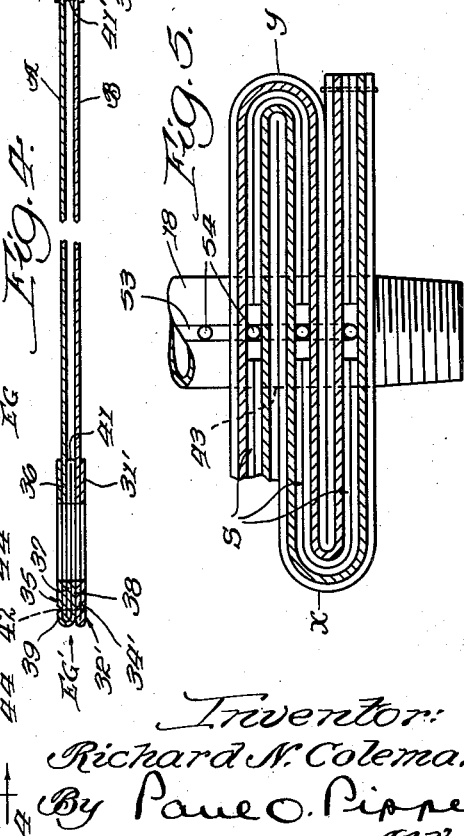
Inventor:
Richard N. Coleman
By Paul O. Pippel
Atty.

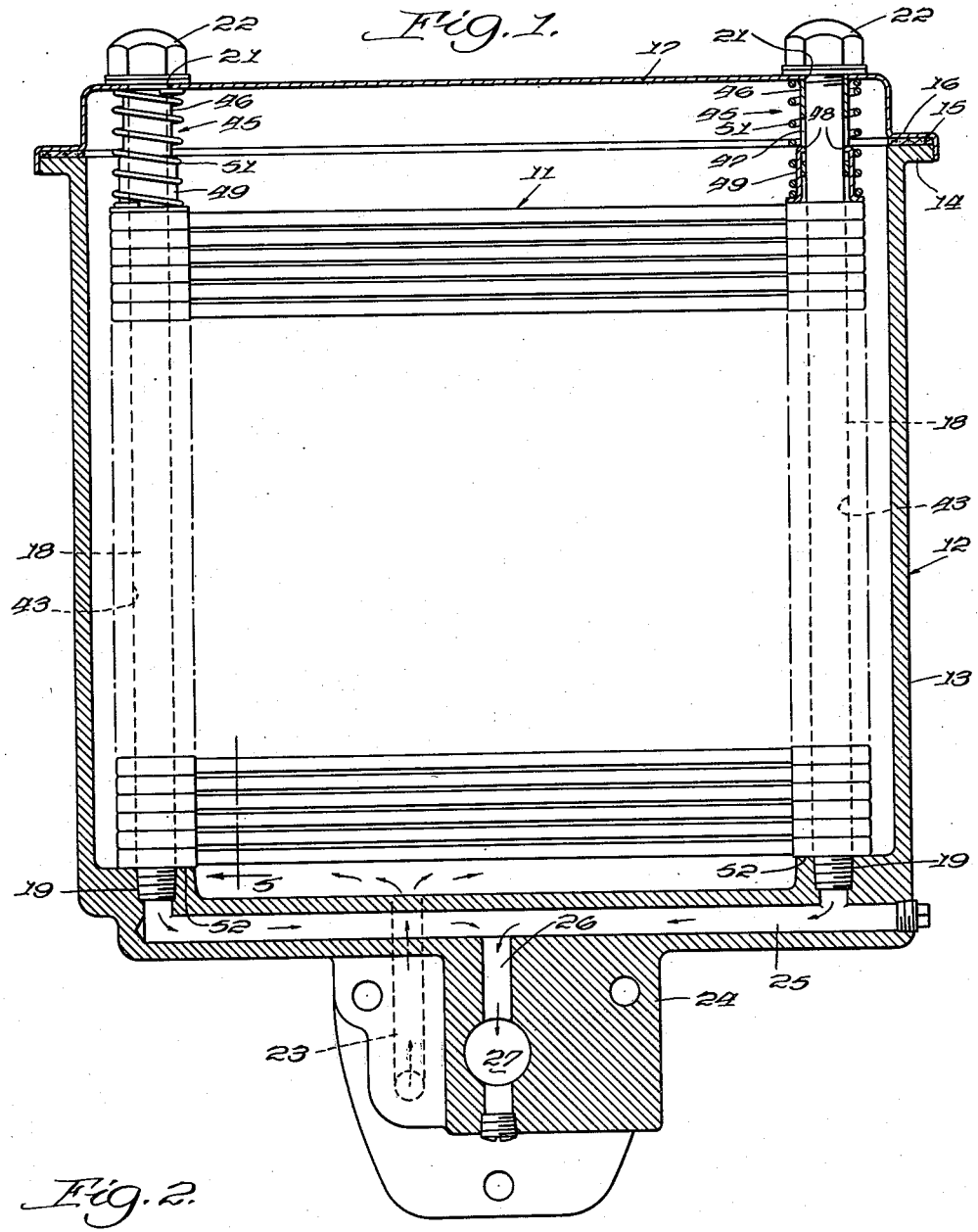
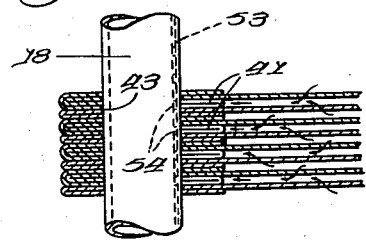

Patented Aug. 8, 1950

2,518,285

UNITED STATES PATENT OFFICE 2,518,285

FILTER ELEMENT

Richard N. Coleman, Broadview, Ill., assignor to International Harvester Company, a corporation of New Jersey Application October 8, 1945, Serial No. 621,041

6 Claims. (Cl. 210—169)

This invention has to do with fluid-filtering devices of the type embodying a thin convoluted envelope with filtering walls urged collapsed by an ambient body of fluid filterable inwardly therethrough, and more particularly concerns a drainage gallery formed of folded portions of the envelope.

The general object of this invention is the provision in a filtering envelope having flatly opposed sheet-like filtering walls folded along lines extending transversely from an edge thereof to effect a convoluted structure, of marginal portions of said walls along said edge assemblable flatwise to form the body of a drainage gallery and containing cut-away sections forming drainage duct means in such gallery.

Another object is the provision of a filtering envelope as the above wherein at least one of the marginal filter-wall portions has a section folded over to lie between the walls and notched or perforated to form drainage ports interiorly communicative with respective convolutions of the envelope.

Another object is the provision in a filtering envelope, as described in the general object above, of at least one marginal edge portion folded to place a section thereof exteriorly of the wall with which it is integral to thereby comprise part of the drainage gallery body and to cause separation of adjacent envelope convolutions.

The invention further contemplates and has for an object the provision of a filtering envelope wherein an edge portion of one of the walls or edge portions of both of said walls are folded lengthwise to dispose marginal sections respectively interiorly and exteriorly of the envelope for spacing the opposed inner faces of the envelope walls as well as for spacing adjacent convolutions of such walls.

These and other desirable objects inherent in and encompassed by the invention will be better understood upon reading the ensuing description with reference to the annexed drawings, illustrating a single preferred form of the invention, wherein:

Figure 1 is a sectional view through a fluid filter casing containing a filtering envelope constructed according to the principles of this invention and illustrated in side elevation.

Figure 2 is a fragmentary sectional view showing the details of construction of a drainage gallery of the filtering element and the assembly thereof about a casing stud.

Figure 3 is a plan view of a filtering envelope in the unfolded condition, said envelope being twisted and having parts thereof broken away to illustrate both sides of both side walls thereof.

Figure 4 is a transverse sectional view of the envelope taken on the line 4—4 in Figure 3.

Figure 5 is a fragmentary sectional view taken through the folded or convoluted envelope on the line 5 in Figure 1.

Figure 6 is a fragmentary perspective view looking at the edge of an end portion of the envelope in a partially folded condition.

The present filtering element is of the discardable type, that is, the element is to be used for a limited period until its filtering utility is partially diminished and then is to be replaced by a new element. The filtering element 11 is shown in its completed and installed relation within a casing 12 in Figure 1.

Casing 12 has a main portion 13 with vertical side walls bounded at their upper edge by a perimetric flange 14 which serves as a support for a gasket 15 which is clamped between this flange and a mating flange 16 bordering the lower edge of a cover member 17. The cover member is held removably in place by means of two tubular studs 18 having threaded lower ends turned into and anchored in threaded holes 19 in the bottom of the casing. Holes 21 in the cover member receive threaded upper end portions of the tubular studs 18, and cap nuts 22 are turnable onto the upper ends of said studs for pressing the cover member firmly into closing relation on the casing. When the apparatus is in use the casing 12 is completely filled with the fluid to be filtered so that the filtering element 11 is completely immersed in the body of fluid within the casing. Unfiltered fluid enters the casing through a passage 23 in the casing bottom 24. This fluid entering the casing through the passage 23 replenishes fluid which passes through the walls of the filtering element 11 and finds its way, in the filtered condition after passing through the filtering walls of the element 11, into the tubular studs 18 in a manner explained in detail hereinafter. From the tubular studs 18 the filtered oil flows downwardly into a casing channel 25 and thence outwardly of the device through passages 26 and 27.

The filtering element comprises an envelope 28 which in one stage of its fabrication is long and narrow as shown in Figure 3. This envelope consists of two identically shaped flatwise-contiguous filtering sheets A and B which may be porous filter paper of which the fibers are protected by any suitable preservative, such as a protective film, if desired. Referring now to Figures 3, 4, and 6, filtering sheet or envelope side wall A can be seen to have one part 31 of an edge portion 32 reversely folded at 33 to lie upon or against a part 34 of such edge portion. The edge portion 32 extends lengthwise along an edge EG of the enevelope. At the opposite edge EG' of the envelope 28, an edge portion 35 of the sheet A consists of longitudinally extending parts 36, 37, 38, and 39. The part 37 is folded reversely with respect to the part 36 to lie thereagainst, while the part 38 is folded reversely to lie against the part 37 and the part 39 is folded reversely to lie on the opposite side of the part 36 from the part 37. Holes are provided in spaced relation lengthwise of the marginal sheet portion 35 in the parts 37 and 38 to form a channel 43 with which port-forming notches 41 communicate. Collectively the marginal parts 37 and 38 provide a spacer element between the sheets A and B and may be regarded as marginal sheet portions having a reversely folded section creased lengthwise thereof. The reversely folded section at which the crease occurs is that section at which the parts 37 and 38 are joined together and folded relatively to one another.

Sheet B is folded at its edges identically with the folding of sheet A and the corresponding elements of these folded parts are identified by the same respective characters with the addition of a prime. Folded filtering sheets A and B are so arranged that the folded marginal parts 37—38 of the sheet A are disposed between these sheets at one edge, EG', of the envelope and that the marginal parts 37'—38' are disposed between the sheets at the opposite edge, EG. Subsequently to this disposal of the folded sheets they are sewn together by one or more lines of stitching 42 extending perimetrically thereabout and with the thread extending through the various parts of the folded marginal portions at the line of coincidence therewith.

The sewn envelope is folded along laterally spaced fold lines X and Y extending transversely between the edges EG and EG', the folds being reverse folds in the respect of being in one direction about the lines X and in the opposite direction about the lines Y so as to attain the convoluted arrangement, illustrated in Figures 1, 5, and 6. In this manner a series of hollow envelope sections S are formed. 180° bends are made in the envelope at the fold lines X and Y, whereby the adjacent ones of the flat envelope sections S are juxtaposed flatwise, as illustrated in Figure 5. Subsequent to this folding of the envelope, it may be drilled to form bores 43, Figures 1 and 5, for respectively receiving the tubular casing studs 18. Such drilling of the folded envelope is done in a manner for causing the bores 43 to intersect or communicate with the cut-out sections or notches 41 and 41' in the envelope wall spacer elements 37—38 and 37'—38'. If desired, marginal edge portions of the filtering sheets can be preformed with cut-outs or holes 44 which when becoming axially registered in the folded sheets constitute transverse sections of the bore 43 and thereby effect such bore.

Assembly of the filtering element 11 within the casing 12 is accomplished by telescoping the bores 43 respectively over the upper ends of the tubular studs 18 while the cap nuts 22 and the cover member 17 are removed. After thus inserting the element 11 into the casing onto the tubular studs, the cover 17 is replaced. The inner side of the cover carries filter element compressing devices 45. Each device comprises a tubular member 46 secured to the inner side of the cover member coaxially with a respective one of the openings 21. This tubular member 46 has a pair of diametrically opposed side wall slots 47 for receiving inwardly turned studs 48 on a tubular slider 49 assembled telescopically with the element 46. A spring 51 reacting between the inner side of the cover and the flanged lower end of the slider 49 urges the slider into a position wherein the studs 48 are in abutment with the lower ends of the slots 47. This condition will prevail when the cover member is removed. However, when the cover member is assembled with the casing, the lower ends of the sliders 49 abut against the upper end of the filter element 11 and press against the material about the upper end of the element bores 43. The material immediately about the lower ends of the bores 43 is abutted by flat surfaces 52 in the bottom of the casing, and the springs 51 cause the laminated assembly of the folded marginal edge portions of the filtering sheets to be compressed firmly together between the casing surfaces 52 and the slider members 49 with sufficient predetermined pressure for establishing sealing contact between the contiguous surfaces of these laminations. Collectively, therefore, the folded marginal edge portions of the filtering sheets being pressed flatwise together form the body of drainage galleries containing the bores 43 and the ports 41 and 41' communicative directly and individually with the flat envelope sections S.

Fluid within the casing 12 and ambient to the envelope 11 passes inwardly through the envelope side walls A and B through the ports 41 and 41' into the bores 43. From these bores the filtered fluid reaches the interior of the tubular studs 18 through exterior channels 53 extending lengthwise thereof and having a series of holes 54 communicative from the bottom of the channels to the interior of the tubes. If desired, the channels 53 may be dispensed with by making the cut-outs 44 or the drainage gallery bore 43 of greater diameter than the exterior diameter of said tubular members. After entry of the filtered fluid into tubular studs 18, it flows outwardly of the casing through the passages 25, 26, and 27 as explained hereinabove.

The internal spacer elements formed by the marginal fold parts 37—38 and 37'—38' provide material in which the ports 41 and 41' can be formed and also serve to separate the filtering walls A and B adjacently to the entrance to these ports. The exterior parts 31 and 31' of the marginal edge portions of the sheets serve as spacer members between the adjacent envelope filtering sections S for increasing the amount of space for the collection of sludge or other solid matter which is separated from the filtered fluid. The exterior separating parts 31, 31', 39, and 39' also function to prevent the filtering sheets being folded at such a short radius at the fold lines X and Y that may cause injury to the filtering portion of the sheets. Using folded edge portions of the sheets for the building of the laminated body of the drainage gallery eliminates the necessity of handling separate parts which would otherwise need to be assembled with the filtering sheets in formation of the laminated gallery structure.

Having thus described a preferred embodiment of the invention with the view of concisely and fully illustrating the same, I claim:

1. In a filter for fluids, a filtering envelope comprising porous flatwise-contiguous sheet-like side walls secured together about their perimetric edges and through which fluid is filterable into the envelope from a fluid body ambient thereto, said side walls having marginal edge portions extending along a common edge of such envelope, at least one of said edge portions being folded to form a spacer element disposed between said side walls and extending lengthwise of said envelope edge, said envelope having a series of laterally spaced reverse folds extending transversely of said edge and thereby incurring a series of hallow envelope sections which are juxtaposed flatwise relatively to adjacent thereof, and means for forming a drainage duct extending through portions of said side walls respectively associated with said envelope hollow sections, said means comprising cut-out-containing portions in said spacer element and respectively communicative with said hollow envelope sections and hole-containing portions in the walls of said sections, said hole-containing wall portions and said cut-out-containing portions of the spacer element being assembleable in registry axially of said holes to dispose said holes and said cut-outs for constituting transverse sections of said drainage duct.

2. In a filter for fluids, a filtering envelope comprising porous flatwise-contiguous sheet-like walls secured together about their edges and through which fluid is filterable into the envelope from a fluid body ambient thereto, said envelope having a series of laterally-spaced reverse folds extending transversely from an edge thereof and thereby incurring a series of flat envelope sections of which those adjoining one another are juxtaposed flatwise, and a channelled drainage gallery for said envelope comprising marginal portions of said sheets extending along said envelope edge, at least one of said marginal sheet portions being folded to lie between said sheets, said marginal portions having cut-out sections arranged intercommunicatively to form respective portions of the channel in said gallery, and the cut-out sections in the one marginal sheet portion communicating with respective envelope sections.

3. In a filter for fluids, a filtering envelope comprising porous flatwise-contiguous sheet-like walls secured together about their edges and through which fluid is filterable into the envelope from a fluid body ambient thereto, said envelope having a series of laterally-spaced reverse folds extending transversely from an edge thereof and thereby incurring a series of flat envelope sections of which those adjoining one another are juxtaposed flatwise, and a channelled drainage gallery for said envelope comprising marginal portions of said sheets extending along said envelope edge and of which at least one is folded lengthwise thereof, said marginal portions being compressible flatwise together to form the body of said gallery and having cut-outs therein comprising parts of a gallery channel which is directly communicative with said envelope sections through at least part of said cut-outs.

4. In a filter for fluids, a filtering envelope comprising porous flatwise-contiguous sheet-like walls secured together about their edges and through which fluid is filterable into the envelope from a fluid body ambient thereto, said envelope having a series of laterally-spaced reverse folds extending transversely from an edge thereof and thereby incurring a series of flat envelope sections of which those adjoining one another are juxtaposed flatwise, and a channelled drainage gallery for said envelope comprising marginal portions of said envelope adjacently to said edge and folded lengthwise thereof in a fashion disposing at least part of said portions between said envelope side walls, said marginal portions being compressible flatwise together to form the body of said gallery and having cut-outs therein comprising parts of a gallery channel which is directly communicative with said envelope sections through at least part of said cut-outs.

5. In a filter for fluids, a filtering envelope comprising porous flatwise-contiguous sheet-like walls secured together about their edges and through which fluid is filterable into the envelope from a fluid body ambient thereto, said envelope having a series of laterally-spaced reverse folds extending transversely from an edge thereof and thereby incurring a series of flat envelope sections of which those adjoining one another are juxtaposed flatwise, and a channelled drainage gallery for said envelope comprising marginal portions of said envelope adjacently to said edge and folded lengthwise thereof in a fashion disposing parts of said marginal portions respectively between and exteriorly of said envelope side walls, said marginal portions being compressible flatwise together to form the body of said gallery and having cut-outs therein comprising parts of a gallery channel which is directly communicative with said envelope sections through at least part of said cut-outs.

6. In a filter for fluids, a filtering envelope comprising porous flatwise-contiguous sheet-like walls secured together about their edges and through which fluid is filterable into the envelope from a fluid body ambient thereto, said envelope having a series of laterally-spaced reverse folds extending transversely from an edge thereof and thereby incurring a series of flat envelope sections of which those adjoining one another are juxtaposed flatwise, and a channelled drainage gallery for said envelope comprising marginal portions of said sheets extending along said envelope edge, one of said marginal sheet portions having a reversely folded section creased lengthwise thereof disposed between said sheets and a section bent about and disposed exteriorly of the sheet with which it is integral, said reversely folded section having notches therein interiorly communicative with respective of the flat envelope sections, said marginal sheet portions being pressable flatwise together to form the body of said gallery, and said marginal edge portions having holes therein which axially register in said body to form a drainag channel therein extending perpendicularly through the flat envelope sections and communicative therewith through said notches.

RICHARD N. COLEMAN.

REFERENCES CITED

The following references are of record in the file of this patent:

UNITED STATES PATENTS

| Number | Name | Date |
| --- | --- | --- |
| 1,651,400 | McKinley | Dec. 6, 1927 |
| 1,746,222 | McKinley | Feb. 4, 1930 |
| 2,063,392 | McCain | Dec. 8, 1936 |
| 2,352,300 | Walker et al. | June 27, 1944 |
| 2,488,726 | Judkins | Nov. 22, 1949 |

FOREIGN PATENTS

| Number | Country | Date |
| --- | --- | --- |
| 16,237 | Great Britain | of 1907 |
| 292,719 | Great Britain | June 28, 1928 |